(12) United States Patent
Ketterling

(10) Patent No.: US 10,745,949 B2
(45) Date of Patent: Aug. 18, 2020

(54) LOCKING BRACKET FOR IRRIGATION TIME CONTROL BOX

(71) Applicant: Kody J. Ketterling, Twin Falls, ID (US)

(72) Inventor: Kody J. Ketterling, Twin Falls, ID (US)

(*) Notice: Subject to any disclaimer, the term of this patent is extended or adjusted under 35 U.S.C. 154(b) by 362 days.

(21) Appl. No.: 15/671,115

(22) Filed: Aug. 7, 2017

(65) Prior Publication Data
US 2019/0040662 A1    Feb. 7, 2019

(51) Int. Cl.
| | | |
|---|---|---|
| *E05C 3/04* | (2006.01) | |
| *E05B 35/00* | (2006.01) | |
| *A47B 57/52* | (2006.01) | |
| *A01G 25/16* | (2006.01) | |
| *E05B 17/20* | (2006.01) | |
| *H02B 1/42* | (2006.01) | |
| *H02G 3/14* | (2006.01) | |

(52) U.S. Cl.
CPC ............. *E05C 3/046* (2013.01); *A01G 25/16* (2013.01); *A47B 57/52* (2013.01); *E05B 17/2088* (2013.01); *E05B 35/008* (2013.01); *H02B 1/42* (2013.01); *H02G 3/14* (2013.01)

(58) Field of Classification Search
CPC . E05C 3/046; E05C 3/00; E05C 3/045; E05C 3/006; E05C 3/008; E05C 3/04; E05C 3/047; E05C 3/048; E05C 19/10; A01G 25/162; A01G 25/165; A47B 57/52; A47B 57/00; E05B 35/008; E05B 35/00; H02B 1/42; H02B 1/40; H02G 3/00; H02G 3/14; E06B 1/12; E06B 1/14; E06B 1/18; E06B 1/22

USPC .......................................................... 292/187
See application file for complete search history.

(56) References Cited

U.S. PATENT DOCUMENTS

| | | | | | |
|---|---|---|---|---|---|
| 1,982,532 | A | * | 11/1934 | O'Brien | E06B 9/50 160/99 |
| 5,245,507 | A | * | 9/1993 | Ericksen | H02B 1/28 174/67 |
| 6,519,208 | B2 | * | 2/2003 | DeVries | G04G 15/00 174/50 |

(Continued)

*Primary Examiner* — Nathan Cumar
(74) *Attorney, Agent, or Firm* — Burdick Patents, P.A.; Sean D. Burdick

(57) ABSTRACT

A locking bracket, for use with an irrigation sprinkler timer box having a base for attachment to a fixed mounting surface, a plurality of side walls extending out from said base, a hinged cover rotatably attached to one side of the timer box, and a cam lock assembly having a rotatable cam plate mounted to the hinged cover in a position for engagement with a locking tab fixed on a sidewall of said timer box located opposite to the side to which the hinged cover is attached, when the hinged cover is closed and the cam lock assembly is in the locked position, is provided and formed of a base plate configured to attachment to the timer box base inside the timer box and a vertical extension bracket attached to and extending normally out from said base plate in juxtaposed, parallel spaced relationship with the timer box sidewall adjacent to the locking tab and has a cam lock receiving slot formed therein and configured for engagement with the cam lock in a position between said cam lock and the locking tab when the hinged lid is closed and the cam lock is positioned for engagement with the locking tab.

3 Claims, 6 Drawing Sheets

(56) References Cited

U.S. PATENT DOCUMENTS

| | | | | |
|---|---|---|---|---|
| 7,378,591 B2* | 5/2008 | Dinh | ............ | H02G 3/086 |
| | | | | 174/50 |
| 7,997,843 B2* | 8/2011 | Bowers | ............ | F16B 21/04 |
| | | | | 24/663 |
| 8,037,723 B2* | 10/2011 | Fong | ............ | A44B 11/2576 |
| | | | | 24/633 |
| 9,413,150 B2* | 8/2016 | Peret | ............ | H02G 3/14 |
| 2011/0128823 A1* | 6/2011 | Lay | ............ | G04C 23/04 |
| | | | | 368/10 |

* cited by examiner

LOCKING BRACKET FOR IRRIGATION TIME CONTROL BOX

TECHNICAL FIELD

This invention relates to a locking bracket for installation, either as original equipment or a retrofitted piece of equipment to a lockable box designed to contain irrigation sprinkler control modules.

BACKGROUND

There are many regions of the United States that are arid or semi-arid to the extent they require regular irrigation to maintain the health and vitality of the landscaping and grass. In some cases these arid and semi-arid regions routinely experience a shortage of water, and as a result water drawn from a municipal water system is a precious and expensive commodity to be conserved as much as possible. In extreme cases of potable water shortage, the amount of water consumed on a piece of property can be priced such that the lowest prices are charged for the minimum amount of water usage and then prices increase on a graduated scale, depending upon the excess usage of water, to discourage excessive consumption of water. Accordingly, it is in the property owner's best interests to use the minimum amount of water that is necessary to sustain the grass and landscaping features of any particular property.

Most residential houses, in arid and semi arid regions, have an underground sprinkler system provided with a timer control, usually located in an enclosed garage. These residential timer controls are not encased within a lockable box so that they are easily accessible to the homeowner for purposes of adjusting the timing and duration of the irrigation cycles, as the seasons pass and the requirements for irrigation increase and/or decrease. The typical timer is provides for a number of different circuits, normally nine or less, and give the operator flexibility as to the number of times a circuit automatically turns on each day, the length of run time for each cycle, and the even the days of the week that the irrigation system actually is operable to control the circuits, for example every day or every other day.

In commercial settings such as a multiple apartment buildings or office complexes, these timers are contained within lockable sprinkler timer boxes which are mounted to the exterior of the building someplace convenient for the landscapers to set them up and control the irrigation. If there are multiple buildings the sprinkler boxes are generally not located in one central location as that would require low voltage wiring runs to the various sprinkler circuit manifolds scattered around the property that may extend for hundreds, if not several hundred, feet in length. Rather than incurring that cost and the unreliability of such a watering and timer wiring system, each building may have its own sprinkler timer box which controls the sprinklers in that particular localized area. These sprinkler timer boxes are typically formed of some sort of plastic, typically polypropylene and/or polyethylene, which has some resilient characteristics and is somewhat pliable so as to withstand impacts from something as simple as a child throwing a baseball or snowball without shattering the box and exposing the timers, electrical circuits and wiring that are contained within the box.

Simple keyed cam locks are provided to secure the boxes. The typical manufacturing standard is that all boxes of a certain model that are produced by the same particular manufacture are keyed using the same key code so as to reduce the number of keys that a landscaper has to carry around when checking the timers on the circuits in the multiple boxes. The initial settings for the irrigation system when installed by the landscaper are carefully selected to provide a sufficient, but never excessive, amount of irrigation water to each irrigation circuit in the system. For example, there may be a circuit which is comprised of shrub bubblers located within a hedge row or some ornamental shrub feature of landscape, and another circuit for grassy or expansive areas that are open and yet a third for some other application such as that in a confined space where the sprinklers might, for example, be located on a small grassy area adjacent to a vehicle parking area and may require specialized sprinklers throwing rectangular or oblong patterns of water.

Sprinkler control circuits also have to be adjusted during changing seasons, for example if the spring is rainy, wet, and cool, less irrigation water will be required and the operating times for each sprinkler and perhaps the frequency of operation can be reduced, and during the heat of hot summer dry days can be increased to compensate for the increased evaporative conditions and the resulted amount of water required for irrigation.

The problem is that tenants often pry open the boxes and readjust the sprinkler timers either up or down to suit that particular tenant's needs or his perceived need for irrigation. For example, a tenant can pry the box open and turn off a sprinkler circuit where overspray on a windy day will soak down his vehicle with irrigation water and leaves dried residue on the vehicle paint as it evaporates. In other cases, it can be just the opposite where a tenant perceives a need to increase the irrigation watering cycle thinking that landscaping shrubbery and grass may need more water than is actually being provided.

The landscapers do not necessarily always check the boxes each and every time they perform maintenance on the lawn and landscaping. It may be two or three weeks before a landscaper checks the circuits and by then it may be too late in that the landscaping is fully stressed by a lack of water, or at the opposite end, the landscaper may not pick up on the increase in the watering cycles or duration of watering until the real estate owners receive an unpleasantly and unexpectedly high water bill from the municipal water system.

Referring to prior art FIG. 1, a typical prior art sprinkler timer box is disclosed. For simplicity sake, the internal timer and electrical components are not shown in the drawings. As can be seen, there is a base portion of the box which is mounted using either screws or bolts to a mounting surface, typically the side of an apartment house or commercial building. The cover is typically hinged either on the side or the bottom and is shown in the prior art drawing FIG. 1, the hinge is on the bottom and it interconnects the base portion of the box and its cover. At some appropriate location adjacent to the open end of the cover a cam lock assembly is installed which is keyed to be locked in place. This is a simple locking mechanism which simply rotates a locking cam to a position where it engages the locking tab molded integral with the box base. The problem with this type of a locking mechanism is that it can be easily defeated by a screwdriver wielding tenant intent on readjusting the irrigation control system. A tenant would simply insert the screwdriver tip between the lip of the cover, as shown in prior art FIG. 2, and then using the lip of the cover as a fulcrum, pry out, and temporarily deform the base sidewall until the locking tab disengages from the locking cam at which point the cover will simply pop open. There is enough pliability and elasticity in the resilient material that the box is formed of to enable a tenant to do this quickly and easily. Once the box is open, a tenant then readjusts the sprinkler timers however the tenant sees fit. And it may be weeks before the landscapers discover that the tenant has done this. This appears to be a common problem experienced by most landscaping maintenance companies.

Accordingly, what is needed is a way to secure these pre-existing irrigation timer boxes so as to prohibit tenants from intentionally breaking into them and readjusting the sprinkler system.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. This Summary is neither intended to define the inventive concept of the application, which is measured by the claims, nor is it intended to be limiting as to the scope of the inventive concept in any way.

Retrofitable locking bracket formed of a vertical extension bracket attached to a base plate at a 90 degree angle. There is a mounting hole provided in the base plate to attach the locking bracket to a mounting bolt which mounts to the back of a generally rectangular box to a mounting surface. An upper extension bracket portion is also provided and configured at an angle which roughly conforms to the arcuate travel experienced by the hinged cover as it is swung open about its hinges. A locking slot is sized and located in a position on the vertical extension bracket where it will engage a locking cam of a cam locking assembly installed on the hinged cover. A padeye hole may be also provided at the upper end of the vertical extension bracket portion as an additional security measure in situations where a box is more frequently being pried open so a padlock can be installed to simply prevent the hinged cover from being opened past a point where it is disengaged with the lock in bracket 10.

The locking bracket is attached, in the preferred embodiment, to the inside surface of the base of the circuit box. Mounting screws are passed through the mounting holes of the locking bracket base and preformed mounting holes in the circuit box base and screwed into the mounting surface to which the circuit box is attached. The vertical extension bracket passes up and between the locking tab on the side of the box and the cam lock assembly and extends out through a slot to be cut in the hinged cover of the timer box. The vertical extension bracket is not attached to the side wall of the timer box and therefore will not deflect with any sidewall of the timer box if the same is being pried open to disengage its locking tab from locking cam plate. The upper vertical extension bracket portion is bent to a position where it roughly conforms to the arcuate line of travel of hinged cover to enable the easy opening and closure of the hinged cover as it is rotated about its hinges. The operator then can insert a key into the keyed cam lock assembly and rotate the cam plate until it engages through the locking bracket slot in the vertical extension bracket to its normally closed and locked position where it will also engage locking tab on the side wall of the timer box. Now, if an unauthorized person attempts to pry open the box by bowing out the side of the timer box to move the locking tab out of engagement with cam plate, the cover will still not pop open since the locking cam is still engaged within the locking slot of the locking bracket. And since the locking bracket is not firmly attached to the sidewall of timer box, it does not move even when side wall is bent outwards to disengage the locking tab from the cam lock plate. Even if a person were to manage to position a second pry bar behind the vertical extension bracket, in an attempt to pry the locking bracket out from engagement with the locking cam, the attempt will fail, as the upper vertical extension portion of the vertical extension bracket will remain engaged within the slot in the hinged cover, thus preventing the necessary deflection of the locking bracket from the locking cam plate.

The locking bracket is primarily intended for a retrofit application in an existing timer box, but it can be included and indeed even incorporated as an original manufactured feature of each box.

In most cases, for the most common irrigation boxes, the mounting holes in the base of the box typically line up with a cam lock. In those cases where they do not for any particular make and model of the irrigation control box where the mounting holes do not line up with the cam lock the base portion of the locking bracket can be reconfigured to provide for such an alignment. In high risk areas and neighborhoods it may be advantageous to mount the locking bracket to at least two mounting bolts or screws inside or at the back of the timer box. This can be accomplished by extending the base portion of the locking bracket to a greater length so that it engages with two mounting holes in the timer box base. It can also be done by using some sort of an interconnected adjustable base portion that can telescope in or out as needed to fit the bolt mounting holes for any particular box.

Still other features and advantages of the presently disclosed and claimed inventive concept will become readily apparent to those skilled in this art from the following detailed description describing preferred embodiments of the inventive concept, simply by way of illustration of the best mode contemplated by carrying out the inventive concept. As will be realized, the inventive concept is capable of modification in various obvious respects all without departing from the inventive concept. Accordingly, the drawings and description of the preferred embodiments are to be regarded as illustrative in nature, and not as restrictive in nature.

DETAILED DESCRIPTION OF THE PREFERRED EMBODIMENTS

Figure 1:
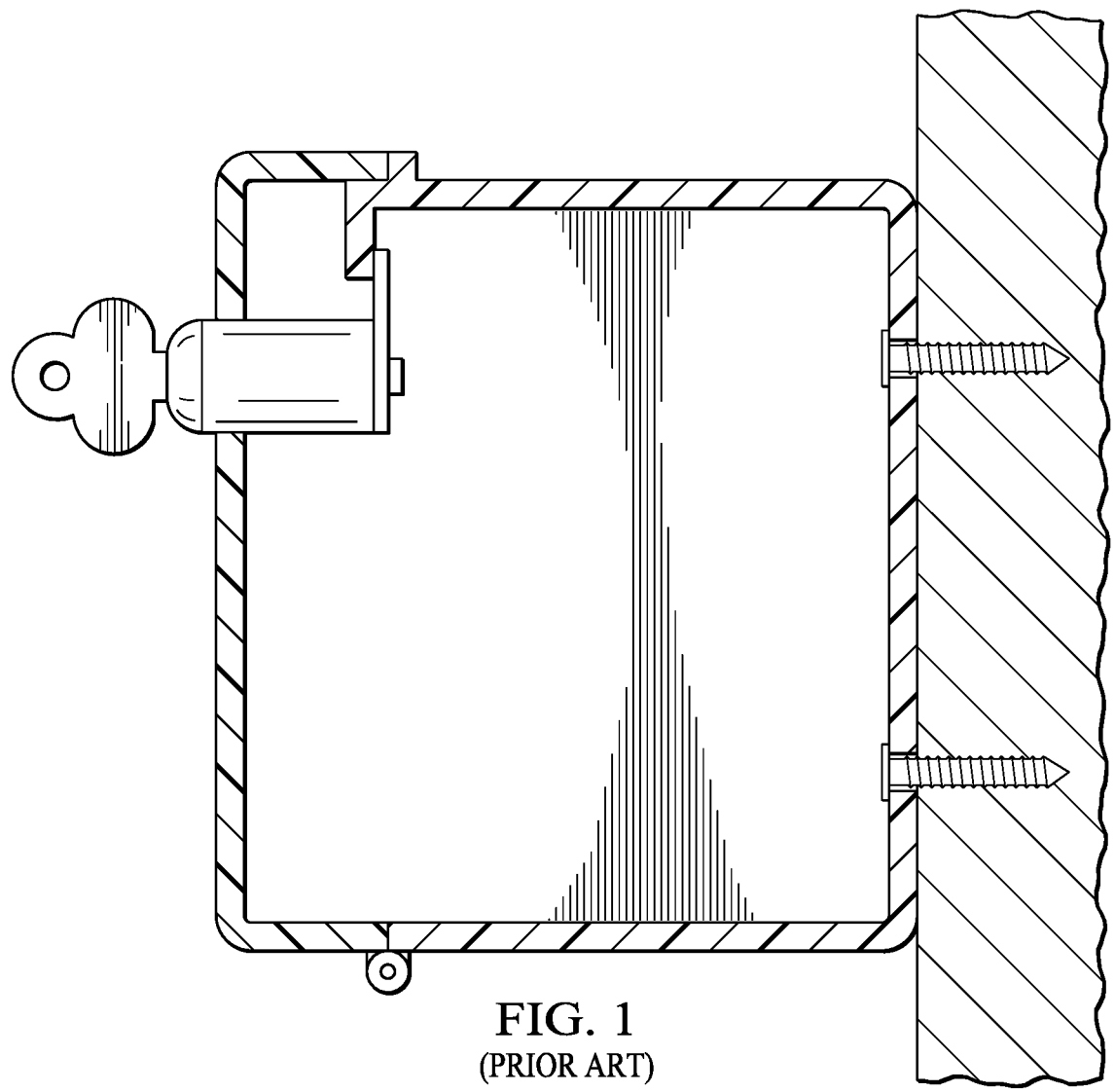
FIG. 1 is prior art drawing of a typical prior art irrigation control box.

While the presently disclosed inventive concept is susceptible of various modifications and alternative constructions, certain illustrated embodiments thereof have been shown in the drawings and will be described below in detail. It should be understood, however, that there is no intention to limit the inventive concept to the specific form disclosed, but, on the contrary, the presently disclosed and claimed inventive concept is to cover all modifications, alternative constructions, and equivalents falling within the spirit and scope of the inventive concept as defined in the claims.

Figure 3:
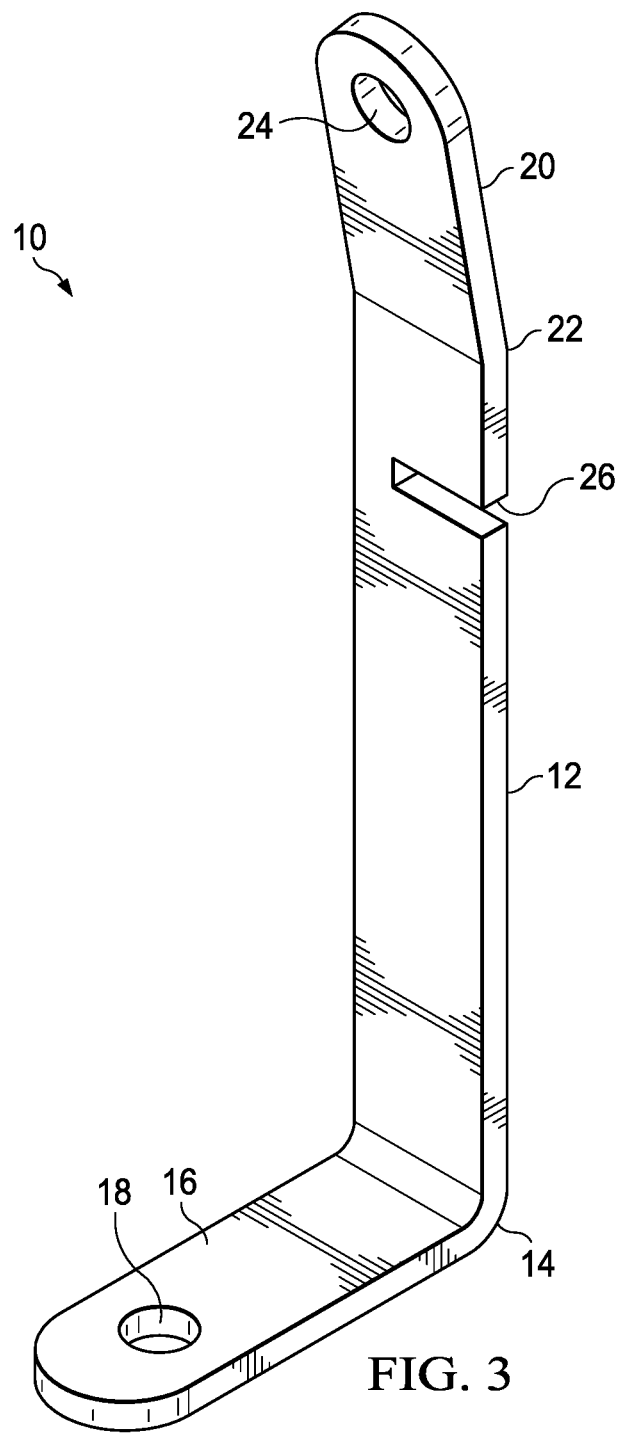
FIG. 3 is perspective representational view of the new locking bracket.
Figure 4:
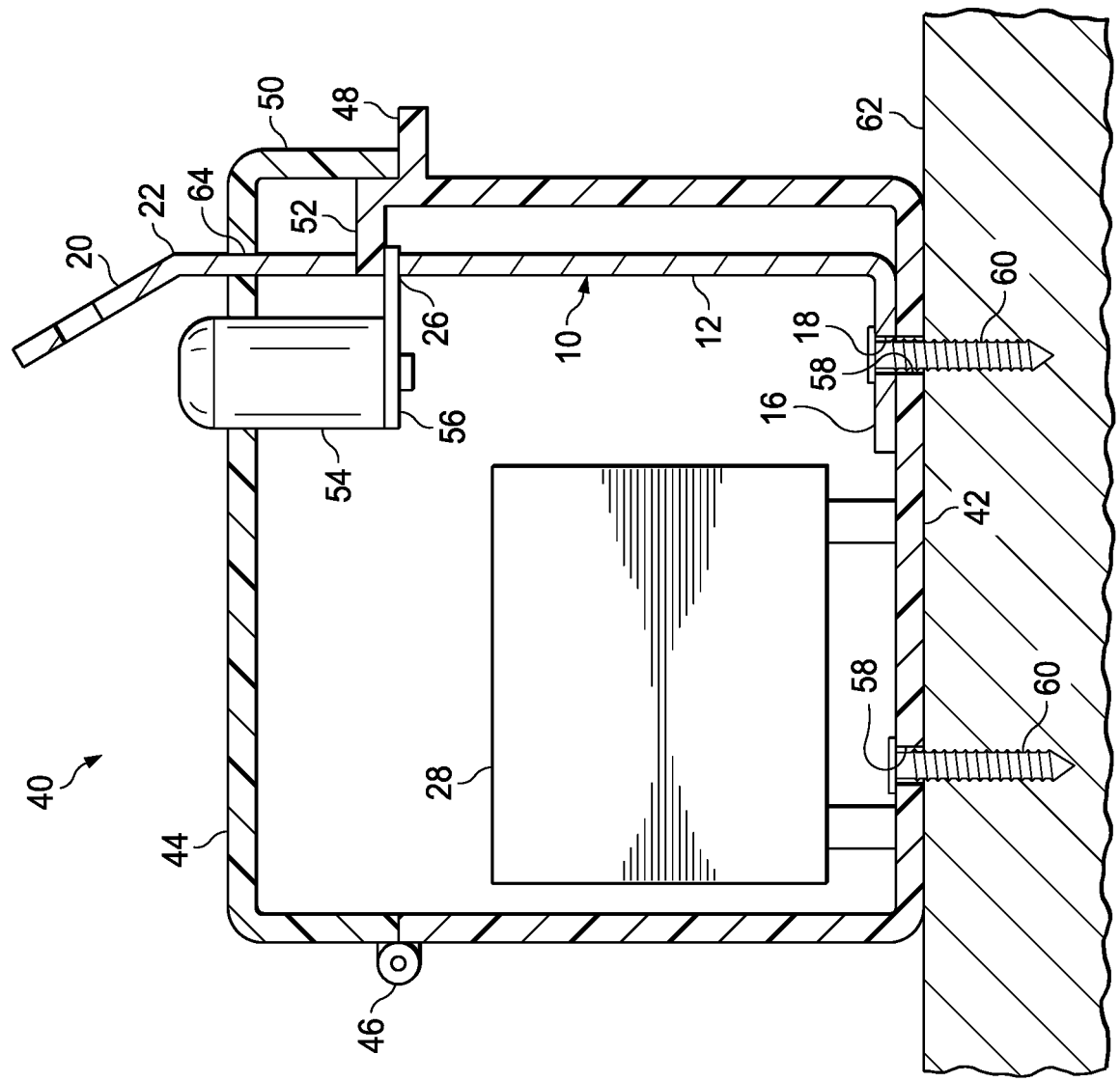
FIG. 4 is a side view of the typical installation of the locking bracket as shown in FIG. 3.

FIG. 3 is a perspective representation of the first embodiment of the retrofitable locking bracket 10, which is formed of vertical extension bracket 12 and a base plate 16 interconnected at a 90 degree bend 14. There is at least one mounting hole 18 provided in base plate 16 to attach the locking bracket to a mounting bolt or screw which mounts to the base 42 of the timer box 40 to a mounting surface. In upper extension bracket portion 20 is also provided and configured, at bend 22, to an angle which roughly conforms to the arcuate travel experienced by the hinged cover 44 as it is swung open about its hinges. A locking slot 26, shown in FIG. 3, is sized and located in a position where it will engage a rotatable locking cam plate 56 as shown in FIG. 4. Padeye hole 24 is also provided so that as additional security in situations where a box is more frequently being pried open so that a padlock can be installed to simply prevent the hinged cover 44 from being opened past a point where it is disengaged with the cam locking plate engaged within locking slot 26 in locking bracket 10.

Figure 2:
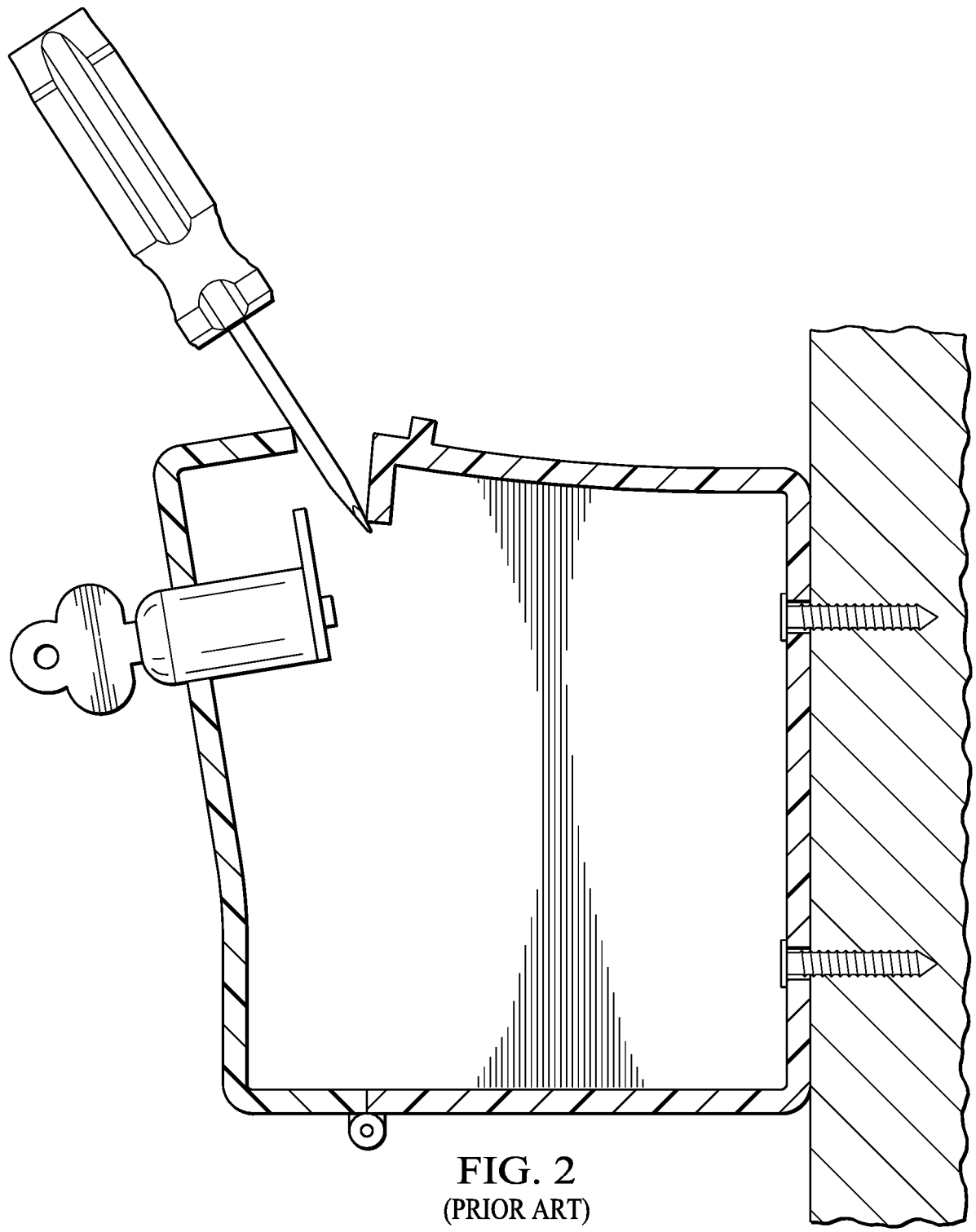
FIG. 2 is a prior art drawing of screwdriver, used as a lever, being used to deform the typical prior art irrigation control box base to disengage with a locking pawl.

As shown in FIG. 4, locking bracket 10 is attached, in the preferred embodiment, to the inside surface of base 42 of timer box 40. Mounting screws 60 pass through the mounting holes 18 in locking bracket base 16 and the preformed mounting holes at 58 in base 42 of timer box 40, as shown in this example, are screwed into mounting surface 62. Vertical extension bracket 12 passes up and between locking tab 52 and cam lock assembly 54 and extends out through a slot 64 to be cut in hinged cover 44. Vertical extension bracket 12 is not attached to any of the side walls of circuit box 40, and therefore will not deflect with any sidewall of timer box 40 if the same is being pried open to disengage its locking tab 52 from locking cam plate 56 as shown in prior art FIG. 2. As can be seen in the upper extension bracket portion 20 is bent to an angle that roughly conforms to the arcuate line of travel of slot 64 to enable the easy opening and closure of hinged cover 44 as it is rotated about hinges 46. The operator then can insert a key, not shown, into the key lock assembly and rotate the cam locking plate 56 until it engages through locking bracket slot 26 to its normally closed and locked position where it will also engage locking tab 52. Now, if an unauthorized person attempts to pry open the box by bowing out the side of the base to move the locking tab 52 out of engagement with cam plate 56, the hinged cover will still not pop open since locking cam plate 56 is still engaged within slot 26 of mounting locking bracket 10. And since locking bracket 10 is not firmly attached to the sidewall of timer box 40, it does not move even when side wall 50 is bent outwards to disengage locking tab 52 from cam lock 56. Even if a person were to manage to position a second pry bar behind vertical extension bracket 12 in an attempt to pry locking bracket 10 out from engagement with locking cam plate 56, the attempt will fail, as upper vertical extension bracket portion 20 will remain engaged within slot 64 in hinged cover 44 thus preventing the necessary deflection of locking bracket 10 from locking cam plate 56.

Irrigation electronic control timer module 28 is shown representationaly mounted to base 42 of timer box 40 in FIG. 4. In the typical configuration for these control modules 28 and how they are interconnected to the lockable timer box 40 which include permanently installed electrical buses either with bayonet connections or screwed connections to receive, hold, and interconnect the timer mechanism control module 28 to its power supply and also to the control wiring for the solenoids of the various irrigation circuits located throughout the landscaped area, usually near a central manifold location for each particular set of irrigation circuits. In such cases, it is a simple matter to turn off the power source to the control box, temporarily remove the control module 28, install the locking bracket 10 in its proper position, cut the slot 64 in the hinged cover 44 at its proper location, and then reinstall the control module 28 and lock the box.

In this matter, the locking bracket 10 is affixed to the back of time box 40 within the lockable timer box where it is not accessible to an intruder who is attempting to open the timer box.

In some cases, it may not be feasible to remove the electronic timer modules. In these cases, the lockable bracket can be configured to pass through the bottom base 42 of the box and be mounted directly to the mounting surface between the base 42 of timer box 40 and the mounting surface where it is equally as inaccessible to the intruder as if it were installed inside the box.

While the locking bracket is primarily intended for a retrofit application, it can be included and indeed even incorporated as an original manufactured feature of each box.

Figure 5:
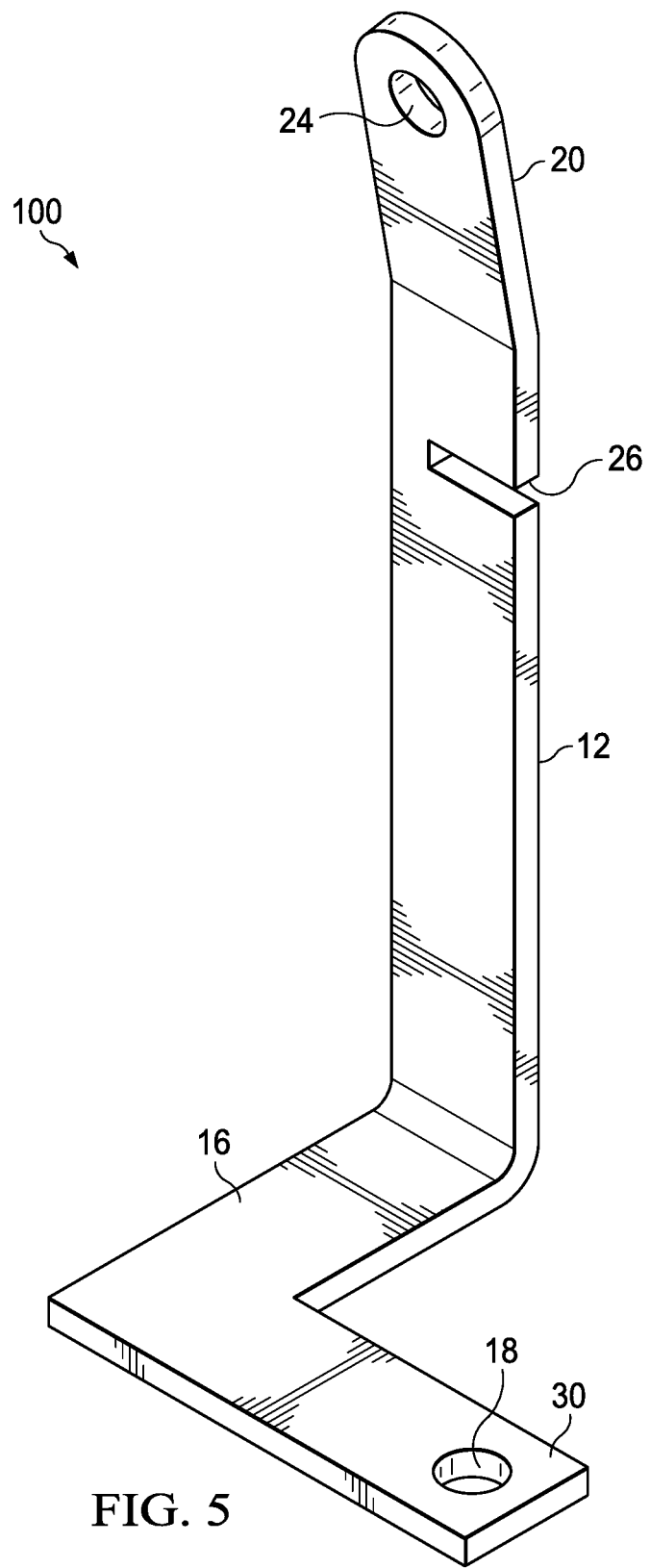
FIG. 5 is a representational side view of a second design for a locking bracket of a different configuration than having an offset base leg for aligning the mounting hole of the locking bracket to the mounting hole in the timer box.

In most cases, for the most common irrigation boxes, the mounting holes 58 typically line up with a cam lock. In those cases where they do not for any particular make and model of the irrigation control box where the mounting holes 58 do not line up with the cam lock the base portion 16 can be reconfigured to provide for such an alignment as shown in FIG. 5. As shown in FIG. 5, first variant locking bracket 100 is provided with offset base portion leg 30 and relocated mounting hole 18. Offset leg portion 30 can be configured in a variety of different lengths, and offset to the left or right, or even at an angle, in order to site relocated mounting hole 18 to coincide with the location of the mounting holes 58 in timer box 40.

Figure 6:
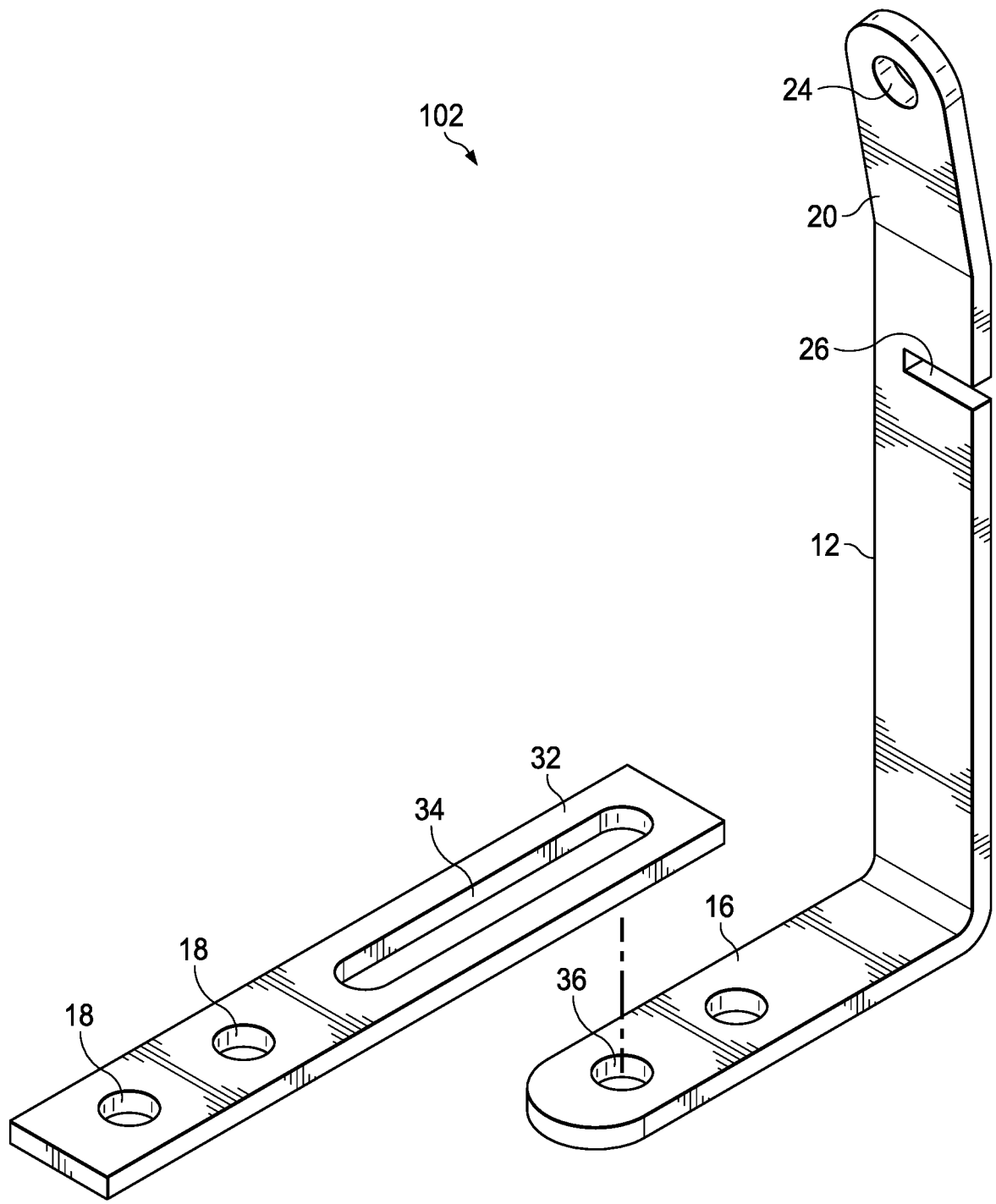
FIG. 6 is a third embodiment of the locking bracket showing an adjustable attachment configuration for a third design of the locking bracket.

In high risk areas and neighborhoods it may be advantageous to mount the locking bracket 10 to attach it at least two mounting bolts or screws inside or at the back of the box 40. This can be accomplished by extending the base portion 16 by incorporation of adjustable base portion 32, to a greater length so that it engages with two mounting holes as shown in FIG. 6. As shown in FIG. 6, adjustable base portion 32 is provided with an adjustment slot 34 which can be connected through use of flat head screws (not shown) to adjustable base portion mounting hole 36 formed in base portion 16 of adjustable locking bracket 102. It can also be done by using some sort of an interconnected adjustable base portion that can telescope in or out as needed to fit the bolt mounting holes for any particular box as shown in FIG. 6. Adjustable base portion 32 can be mounted either underneath or on top of base portion 16 of adjustable locking bracket 102, as in either case, once attached using timer box 40 mounting holes 58 using mounting screws 30 it will be clamped firmly in place.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A locking bracket, for use with an irrigation sprinkler timer box having a base for attachment to a fixed mounting surface, a plurality of side walls extending out from said base, a hinged cover rotatably attached to one side of the timer box, and a cam lock assembly having a rotatable cam plate mounted to the hinged cover in a position for engagement with a locking tab fixed on a sidewall of said timer box located opposite to the side to which the hinged cover is attached, when the hinged cover is closed and the cam lock assembly is in the locked position, which comprises:

a base plate configured to attachment to the timer box base inside the timer box;

means for attaching the base plate to the timer box base; and a vertical extension bracket attached to and extending out from said base plate in juxtaposed, parallel spaced relationship with the timer box sidewall adjacent to the locking tab, said vertical extension bracket having a slot formed therein and configured for engagement with the rotatable cam plate in a position between said cam lock assembly and the locking tab when the hinged cover is closed and the rotatable cam plate is positioned for engagement with the locking tab;

wherein the vertical extension bracket of the locking bracket is configured in size and shape to extend an upper extension bracket portion of the vertical extension bracket out through a slot cut in the hinged cover when the hinged cover is closed.

2. The locking bracket of claim 1 which further comprises:

the upper extension bracket portion of the vertical extension bracket is bent at an angle to generally conform to the arcuate angle at which the hinged cover travels when the hinged cover is swung open or closed.

3. The locking bracket of claim 1 wherein the vertical extension bracket is not attached to or in contact with any side wall of the timer box.

* * * * *